United States Patent [19]

Krell et al.

[11] Patent Number: 5,300,554

[45] Date of Patent: Apr. 5, 1994

[54] AQUEOUS CONTACT ADHESIVE DISPERSIONS, PROCESS FOR THEIR PREPARATION, AND THEIR USE

[75] Inventors: Manfred Krell, Muhldorf am Inn; Wilfried Huster; Joachim Fischer, both of Emmerting, all of Fed. Rep. of Germany

[73] Assignee: Wacker Chemie GmbH, Munich, Fed. Rep. of Germany

[21] Appl. No.: 988,673

[22] Filed: Dec. 10, 1992

[30] Foreign Application Priority Data

Dec. 13, 1991 [DE] Fed. Rep. of Germany ....... 4141168

[51] Int. Cl.$^5$ ............................................. C09J 129/02
[52] U.S. Cl. ................................... 524/547; 524/812; 524/813; 524/814; 524/817
[58] Field of Search ............... 524/547, 812, 813, 814, 524/817

[56] References Cited

U.S. PATENT DOCUMENTS

| | | | |
|---|---|---|---|
| 4,322,516 | 3/1980 | Wiest et al. | 526/307.7 |
| 4,477,622 | 10/1984 | Sanderson et al. | 524/522 |
| 4,831,077 | 9/1988 | Ball et al. | 524/820 |
| 4,960,802 | 3/1988 | DiStefano | 521/72 |
| 4,975,481 | 11/1988 | Tamm et al. | 524/317 |
| 4,997,879 | 4/1988 | Weissgerber et al. | 524/823 |
| 5,120,785 | 6/1992 | Walker et al. | 524/423 |

FOREIGN PATENT DOCUMENTS

0321868  12/1988  European Pat. Off.
3920935  6/1989  Fed. Rep. of Germany .

OTHER PUBLICATIONS

R. S. Whitehouse, Crit. Rep. Appl. Chem., No. 16. pp. 2-30 (1987).

*Primary Examiner*—Joseph L. Schofer
*Assistant Examiner*—R. H. Delmendo
*Attorney, Agent, or Firm*—Burgess, Ryan and Wayne

[57] ABSTRACT

The invention relates to aqueous contact adhesive dispersions containing, based on the total weight of the dispersion, from 40 to 70% by weight of a copolymer prepared by emulsion polymerization, where the copolymer contains a) from 40 to 70% by weight of vinyl esters of aliphatic carboxylic acids having 2 to 12 carbon atoms,
b) from 10 to 40% by weight of acrylic acid esters of aliphatic alcohols having 4 to 12 carbon atoms,
c) from 8 to 15% by weight of methacrylic acid esters of aliphatic alcohols having 4 to 12 carbon atoms,
d) from 0.1 to 3% by weight of ethylenically unsaturated compounds which cause cross-linking,
e) from 0.1 to 5% by weight of ethylenically unsaturated carboxylic acids,
f) from 0.1 to 2% by weight of substituted and unsubstituted (meth)acrylamides,
g) from 0.5 to 3% by weight of ethylenically unsaturated hydroxyalkyl-functional compounds, and
h) from 0.5 to 3% by weight of ethylenically unsaturated sulfates and/or sulfonates.

The invention furthermore relates to a process for the preparation of the contact adhesive dispersions and to their use.

9 Claims, No Drawings

AQUEOUS CONTACT ADHESIVE DISPERSIONS, PROCESS FOR THEIR PREPARATION, AND THEIR USE

FIELD OF THE INVENTION

The invention relates to aqueous contact adhesive dispersions based on vinyl ester-acrylate copolymers, to a process for their preparation, and to their use.

BACKGROUND OF THE INVENTION

Contact adhesives are a special type of adhesive in which the two parts to be joined are bonded with application of pressure after the adhesive has been applied to the substrate on both sides and after a corresponding open waiting time. In a similar manner to pressure-sensitive adhesives, contact adhesives are used exclusively in the dry state after a film has formed, in particular for bonding non-absorbent substrates or if the use of machines must be avoided for the production of the adhesive bonds. Contact adhesives essentially differ from pressure-sensitive adhesives in that polymer films based on pressure-sensitive adhesives have the ability, due to their viscoelastic properties, to wet a very wide variety of substrates, even at very low pressure, and to adhere to them, but at lower adhesive strength. In the case of contact adhesives, diffusion of the two polymer films into one another only commences when the polymer films of two substrates coated with contact adhesives are brought into contact with one another for a few seconds with application of pressure, and a uniform polymer film is formed. The adhesive bonds produced using pressure-sensitive adhesives therefore have significantly lower adhesive strength (they only adhere), in particular immediately after formation of the bond and at elevated temperature, than adhesive bonds based on contact adhesives. In addition, adhesive bonds based on pressure-sensitive adhesives, in contrast to adhesive bonds produced using contact adhesives, do not withstand static long-term peel and/or long-term shear loads. Adhesive bonds produced using contact adhesives develop high adhesive strength immediately after production of the bond.

Contact adhesives are normally prepared on the basis of polychloroprene, which is dissolved in organic solvents. However, these adhesives are disadvantageous because they contain toxic and flammable solvents (R. S. Whitehouse, Crit. Rep. Appl. Chem., No. 16, pg. 2 (1987)). Attempts have therefore been made to prepare water-based contact adhesives.

The disadvantages of aqueous dispersions of this type are their low adhesive strength in dispersions prepared on the basis of polychloroprene, the "cold flow" in the case of polyacrylate dispersions (in particular in the region of critical adhesive bonds, for example edges), and the low adhesive strength or low adhesion in the case of dispersions based on ethylene-vinyl acetate (E/-VAc) (DE-3737 630 A1 (U.S. Pat. No. 4,975,481)).

The use of dispersions based on E/VAc in contact adhesive processes can be improved by the use of plasticizers (EP 321 868 A2). The use of such dispersions is also improved if formulated with resins which act as tackifiers and if small amounts of organic solvents are added (EP 315 070 A2, U.S. Pat. No. 4,975,481). Another process describes the foaming of the applied adhesive (based on ethylene-vinyl acetate) before the two parts to be joined are bonded (U.S. Pat. No. 4,960,802). The use of a mixture of two dispersions of low and high glass transition temperature is described in DE 39 20 935 A1. The use of such dispersions as contact adhesives results in good peel strengths, but there is no mention of the static load-bearing capacity of the adhesive bonds. The preparation of a contact adhesive whose copolymer is distinguished by a very broad molecular weight distribution is described in U.S. Pat. No. 4,477,622.

DE 29 15 887 A1 (U.S. Pat. No. 4,322,516), DE 34 46 565 A1 (U.S. Pat. No. 4,831,077) and DE 35 31 601 A1 (U.S. Pat. No. 4,997,879) describe the preparation of dispersions based on ethylene-vinyl acetate or ethylene-vinyl acetate-acrylate which ar distinguished by particularly good adhesion and increased heat resistance. However, dispersions of this type are not suitable for use as contact adhesives unless formulated with further compounds, and have, in particular, no resistance to static long-term loading by shear forces or peeling.

The object was, therefore, to find an aqueous contact adhesive which gives peel-resistant and/or shear resistant adhesive bonds and has good adhesion to various substrates and high cohesion at elevated temperatures, even without further formulation.

SUMMARY OF THE INVENTION

Surprisingly, the object of providing a peel-resistant and shear-resistant contact adhesive has been achieved by copolymerizing methacrylates of aliphatic alcohols having 4 to 12 carbon atoms in the stated amounts into vinyl ester-acrylate copolymers.

The invention relates to aqueous contact adhesive dispersions containing, based on the total weight of the dispersion, from 40 to 70% by weight of a copolymer which has been prepared by emulsion polymerization, whose glass transition temperature is in the range from $-20$ to $+20°$ C. and whose Fikentscher K value is between 50 and 80, wherein the copolymer contains a) from 40 to 70% by weight of vinyl esters of aliphatic carboxylic acids having 2 to 12 carbon atoms, b) from 10 to 40% by weight of acrylic acid esters of aliphatic alcohols having 4 to 12 carbon atoms, c) from 8 to 15% by weight of methacrylic acid esters of aliphatic alcohols having 4 to 12 carbon atoms, d) from 0.1 to 3% by weight of ethylenically unsaturated compounds which cause cross-linking, e) from 0.1 to 5% by weight of ethylenically unsaturated carboxylic acids, f) from 0.1 to 2% by weight of substituted and unsubstituted (meth)acrylamides, g) from 0.5 to 3% by weight of ethylenically unsaturated hydroxyalkyl-functional compounds, and h) from 0.5 to 3% by weight of ethylenically unsaturated sulfates and/or sulfonates, where the amounts of each component are based on the total weight of the copolymer, and the proportions in percent by weight in the copolymer add up to 100% by weight.

DETAILED DESCRIPTION OF THE INVENTION

Preferred vinyl esters (a) are vinyl acetate, vinyl propionate, vinyl laurate and vinyl esters of the Versatic acids (saturated α-branched monocarboxylic acids), in particular having 9 carbon atoms, or mixtures of said monomers. Particular preference is given to vinyl acetate, alone or mixed with one or more further vinyl esters in proportions of from 25 to 55% by weight, in particular from 30 to 50% by weight, and vinyl laurate mixed with one or more further vinyl esters in proportions of from 5 to 30% by weight, in particular from 10 to 25% by weight.

Preferred acrylic acid esters (b) are n-butyl acrylate and 2-ethylhexyl acrylate, or mixtures thereof. These are preferably employed in proportions of from 10 to 40% by weight, particularly preferably from 15 to 30% by weight.

Preferred methacrylic acid esters (c) are methyl methacrylate, tert.-butyl methacrylate, ethyl methacrylate, n-propyl methacrylate, i-propyl methacrylate or mixtures of said monomers. Particular preference is given to methyl methacrylate. The methacrylic acid esters are preferably employed in proportions of from 8 to 12% by weight.

Preferred ethylenically unsaturated compounds (d) which cause crosslinking are, for example, acrylamidoglycolic acid (AGA), methylacrylamidoglycolic acid methyl ester (MAGME), 2-acrylamido-2-methylpropanesulfonic acid (AMPSA), N-methylolacrylamide (NMAA), N-methylolmethacrylamide, N-methylolallyl carbamate, alkyl ethers or esters of N-methylolacrylamide, of N-methylolmethacrylamide or of N-methylolallyl carbamate. Particular preference is given to N-methylolacrylamide (NMAA).

Preferred ethylenically unsaturated carboxylic acids (e) are $\alpha,\beta$-unsaturated carboxylic acids, particularly preferred are acrylic acid and methacrylic acid, in particular acrylic acid.

Component (f) is preferably acrylamide. The preferred proportion is from 0.2 to 1.5% by weight.

The hydroxyalkyl-functional compounds (g) are preferably 2-hydroxyethyl acrylate and 2-hydroxypropyl acrylate; 2-hydroxyethyl acrylate is particularly preferred.

The ethylenically unsaturated sulfates and sulfonates (h) are preferably the alkali metal salts of vinylsulfonic acid.

The invention furthermore relates to the preparation of the contact adhesive dispersions according to the invention by emulsion polymerization. In this process, either all of component (a) is introduced initially or some is metered in later, preferably all is introduced initially. At least 50% by weight of components (b) and (c) are not metered in until during the reaction. Some of component (d) may likewise be introduced initially and some metered in, or all metered in, preferably all metered in. Component (e) may likewise all be metered in, some introduced initially and some metered in or all introduced initially. All of components (f) and (h) are introduced initially, while all of component (g) is metered in.

The polymerization is initiated using conventional water-soluble free-radical formers. These are, in particular, persulfates (for example ammonium persulfate and potassium persulfate), hydroperoxides (for example t-butyl hydroperoxide) and perphosphates. The preferred proportion of these free-radical formers is from 0.05 to 3% by weight based on the total weight of the monomers. These compounds can be activated either directly by increasing the temperature or at low temperatures by using reducing agents. Examples of such reducing agents are sodium formaldehyde sulfoxylate, sodium sulfite, sodium hydrogen sulfite and dithionite.

The preferred pH range for the polymerization reaction is from 2 to 5.5. The pH is adjusted or regulated using acids, for example sulfuric acid, formic acid or acetic acid, and bases, for example ammonia, sodium hydroxide solution or potassium hydroxide solution, amines or by using buffer substances, for example alkali metal acetates, alkali metal carbonates or alkali metal diphosphates.

The polymerization is carried out in the presence of conventional emulsifiers. These are, in particular, alkyl and alkylaryl ethoxylates, which may optionally be additionally provided with sulfate, phosphate, succinate or sulfonate groups. The preferred amount of these emulsifiers is from 1 to 5% by weight, based on the total weight of the dispersion.

The invention furthermore relates to the use of the adhesive dispersion according to the invention for bonding substrate together by contact. To this end, the substrates to be bonded are coated with 10 to 400 g/m$^2$, preferably from 30 to 250 g/m$^2$, of the contact adhesive dispersion. The coatings are dried at room temperature or elevated temperature, and the polymer films are subsequently placed against one another at room temperature in such a manner that the adhesive coatings of the substrates come into contact with one another. The substrates to be bonded are then usually pressed together for at least two seconds, preferably for from 5 to 40 seconds, at a pressure of at least 0.05 N/mm$^2$, preferably from 0.1 to 2.0 N/mm$^2$.

The contact adhesive dispersions according to the invention can be used to bond absorbent and non-absorbent substrates, for example metals, leather, felt, woven textile materials, wood, cork, paper or foams, to themselves, or to one another.

The adhesive bonds produced using the contact adhesive dispersions according to the invention are distinguished by particularly high adhesive strength, even immediately after production of the bond, excellent adhesion and high resistance to static long-term load. In contrast to coatings based on conventional solvent-containing contact adhesives, which must generally be bonded after from 15 to 60 minutes, coatings based on the contact adhesive dispersions according to the invention can be bonded by the contact method even after days without significant deterioration in performance.

It is particularly advantageous that the contact adhesive dispersions according to the invention can be employed without additional modification, such as, for example, by the addition of plasticizer, addition of tackifier or bond formation at elevated temperature, as aqueous contact adhesives, for example for bonding floor coverings, for the production of decorative laminate sheets, for full-area bonding of foams or as universal contact adhesives for do-it-yourself applications.

The examples below serve to illustrate the invention.

EXAMPLE 1

401 g of demineralized water, 8 g of a nonylphenol polyglycol ether (containing on average 23 EO units), 3 g of a $C_{15}$-alkylsulfonate, 18 g of sodium vinyl sulfonate, 5 g of acrylamide and 9.5 g of acrylic acid were introduced into a reactor provided with reflux condenser, stirrer, metering means, nitrogen inlet and heating and cooling means, and the pH was adjusted to 3.5 by means of concentrated ammonia solution. 355 g of vinyl acetate, 139 g of vinyl laurate and 49 g of 2-ethylhexyl acrylate were emulsified into this solution. The mixture was heated to 50° C., and the metering of a 3.5% ammonium persulfate solution (10.5 g/h) and a 2% sodium formaldehyde sulfoxylate solution (10.5 g/h) was commenced. When the reaction had commenced, a mixture of 186 g of 2-ethylhexyl acrylate, 87 g of methyl methacrylate, 15 g of hydroxyethyl acrylate and 14 g of acrylic acid (metering 1) and a solution of a further 7.5 g of the nonylphenol polyglycol ether and 6 g of N-methylolacrylamide in 35 g of demineralized water were metered in continuously over a period of 4.5 hours. The metering of the ammonium persulfate solution and of the sodium formaldehyde sulfoxylate solution was then continued for a further 2.5 hours.

After cooling, a stable dispersion having a solids content of 59.5%, a K value (according to Fikentscher, 1% in tetrahydrofuran/water 93:7 (V/V)) of 105, and a viscosity of 16000 mPa.s (Brookfield, 20 rpm) was obtained.

EXAMPLE 2

393 g of demineralized water, 6 g of a nonylphenol polyglycol ether (containing on average 23 EO units), 2.4 g of a $C_{15}$-alkylsulfonate, 4.5 g of sodium vinyl sulfonate, 4 g of acrylamide and 1.7 g of acrylic acid were introduced into a reactor provided with reflux condenser, stirrer, metering means, nitrogen inlet and heating and cooling means, and the pH was adjusted to 3.5 by means of concentrated ammonia solution. 402 g of vinyl acetate, 170 g of vinyl laurate and 36 g of 2-ethylhexyl acrylate were emulsified into this solution. The mixture was heated to 50° C., and the metering of a 3.5% ammonium persulfate solution (10.5 g/h) and a 2% sodium formaldehyde sulfoxylate solution (10.5 g/h) was commenced. When the reaction had commenced, a mixture of 134 g of 2-ethylhexyl acrylate, 101 g of methyl methacrylate, 15 g of hydroxyethyl acrylate and 2.5 g of acrylic acid (metering 1) and a solution of a further 6 g of the nonylphenol polyglycol ether and 18 g of N-methylolacrylamide in 36 g of demineralized water were metered in continuously over a period of 4.5 hours. The metering of the ammonium persulfate solution and of the sodium formaldehyde sulfoxylate solution was then continued for a further 2.5 hours.

After cooling, a stable dispersion having a solids content of 60.5%, a K value (according to Fikentscher, 1% in tetrahydrofuran/water 93:7 (V/V)) of 111, and a viscosity of 19000 mPa.s (Brookfield, 20 rpm) was obtained.

EXAMPLE 3

417 g of demineralized water, 7.5 g of a nonylphenol polyglycol ether (containing on average 23 EO units), 3 g of $C_{15}$-alkylsulfonate, 4.5 g of sodium vinyl sulfonate, 13 g of acrylamide and 12 g of acrylic acid were introduced into a reactor provided with a reflux condenser, stirrer, metering means, nitrogen inlet and heating and cooling means, and the pH was adjusted to 3.5 by means of concentrated ammonia solution. 257 g of vinyl acetate, 86 g of VeoVa-9 (vinyl esters of saturated α-branched monocarboxylic acids having 9 carbon atoms) and 79 g of 2-ethylhexyl acrylate were emulsified into this solution. The mixture was heated to 50° C., and the metering of a 3.5% ammonium persulfate solution (10.5 g/h) and a 2% sodium formaldehyde sulfoxylate solution (10.5 g/h) was commenced. When the reaction had commenced, a mixture of 289 g of 2-ethylhexyl acrylate, 86 g of methyl methacrylate, 15 g of hydroxyethyl acrylate and 11 g of acrylic acid and a solution of 7.5 g of nonylphenol polyglycol ether and 18 g of N-methylolacrylamide in 42 g of demineralized water were metered in continuously over a period of 4.5 hours. The metering of the ammonium persulfate solution and of the sodium formaldehyde sulfoxylate solution was then continued for a further 2.5 hours.

After cooling, a stable dispersion having a solids content of 58%, a K value (according to Fikentscher, 1% in tetrahydrofuran/water 93:7 (V/V)) of 97.2, and a viscosity of 64000 mPa.s (Brookfield, 20 rpm) was obtained.

EXAMPLE 4

421 g of demineralized water, 7.5 g of a nonylphenol polyglycol ether (containing on average 23 EO units), 3 g of a $C_{15}$-alkylsulfonate, 24 g of sodium vinyl sulfonate, 6 g of acrylamide and 12 g of acrylic acid were introduced into a reactor provided with a reflux condenser, stirrer, metering means, nitrogen inlet and heating and cooling means, and the pH was adjusted to 3.5 by means of concentrated ammonia solution. 407 g of vinyl acetate, 222 g of vinyl laurate and 63 g of 2-ethylhexyl acrylate were emulsified into this solution. The mixture was heated to 50° C., and the metering of a 4.6% ammonium persulfate solution (10.5 ml/h) and a 2.5% sodium formaldehyde sulfoxylate solution (10.5 ml/h) was commenced. When the reaction had commenced, a mixture of 237 g of 2-ethylhexyl acrylate, 110 g of methyl methacrylate, 19 g of hydroxyethyl acrylate and 18 g of acrylic acid (metering 1) and a further 11.5 g of the nonylphenol polyglycol ether, 0.8 g of the alkyl sulfate and 7.4 g of N-methylolacrylamide in 31 g of demineralized water (metering 2) were metered in continuously over a period of 4.5 hours. The metering of the ammonium persulfate solution and of the sodium formaldehyde sulfoxylate solution was then continued for a further 2.5 hours.

After cooling, a stable dispersion having a solids content of 65.7%, a K value (according to Fikentscher, 1% in tetrahydrofuran/water 93:7 (V/V)) of 104.5, and a viscosity of 23250 mPa.s (Brookfield, 20 rpm) was obtained.

EXAMPLE 5

409 g of demineralized water, 7.5 g of a nonylphenol polyglycol ether (containing on average 23 EO units), 3 g of a $C_{15}$-alkylsulfonate, 24 g of sodium vinyl sulfonate, 6 g of acrylamide and 12 g of acrylic acid were introduced into a reactor provided with a reflux condenser, stirrer, metering means, nitrogen inlet and heating and cooling means, and the pH was adjusted to 3.5 by means of concentrated ammonia solution. 407 g of vinyl acetate, 222 g of vinyl laurate and 63 g of 2-ethylhexyl acrylate were emulsified into this solution. The mixture was heated to 50° C., and the metering of a 4.6% ammonium persulfate solution (10.5 ml/h) and a 2.5% sodium formaldehyde sulfoxylate solution (10.5 ml/h) was commenced. When the reaction had commenced, a mixture of 237 g of 2-ethylhexyl acrylate, 110 g of methyl methacrylate, 19 g of hydroxyethyl acrylate and 18 g of acrylic acid (metering 1) and a further 11.5 g of the nonylphenol polyglycol ether and 0.8 g of the alkyl sulfate in 31 g of demineralized water (metering 2) were metered in continuously over a period of 4.5 hours. When meterings 1 and 2 were complete, a solution of 7.4 g of N-methylolacrylamide in 10 g of water was metered in over a period of 2 hours in a further metering 3. The metering of the ammonium persulfate solution and of the sodium formaldehyde sulfoxylate solution was then continued for a further 1 hour.

After cooling, a stable dispersion having a solids content of 65.0%, a K value (according to Fikentscher, 1% in tetrahydrofuran/water 93:7 (V/V)) of 101, and a viscosity of 5600 mPa.s (Brookfield, 20 rpm) was obtained.

COMPARATIVE EXAMPLE A

The procedure of Example 1 was repeated. However, 423 g of vinyl acetate, 40 g of 2-ethylhexyl acrylate and 155 g of vinyl laurate were emulsified into the reactor. Metering 1 comprised 152 g of 2-ethylhexyl acrylate, 40 g of methyl methacrylate, 15 g of hydroxyethyl acrylate and 14 g of acrylic acid. The composition of the remainder of the initial reactor contents and the meterings were as in Example 1.

After cooling, a stable dispersion having a solids content of 60%, a K value (according to Fikentscher, 1% in tetrahydrofuran/water 93:7 (V/V)) of 107, and a viscosity of 1800 mPa.s (Brookfield rheometer, 20 rpm) was obtained.

COMPARATIVE EXAMPLE B

The procedure of Example 1 was repeated. However, 405 g of vinyl acetate, 40 g of 2-ethylhexyl acrylate and 203 g of vinyl laurate were emulsified into the reactor. Metering 1 comprised 161 g of 2-ethylhexyl acrylate, 15 g of hydroxyethyl acrylate and 14 g of acrylic acid. The composition of the remainder of the initial reactor contents and the meterings were as in Example 1.

After cooling, a stable dispersion having a solids content of 60%, a K value of 113, and a viscosity of 1880 mPa.s (Brookfield rheometer, 20 rpm) was obtained.

COMPARATIVE EXAMPLE C

The procedure of Example 2 was repeated. However, 481 g of vinyl acetate, 34 g of 2-ethylhexyl acrylate and 161 g of vinyl laurate were emulsified into the reactor. Metering 1 was changed to 127 g of 2-ethylhexyl acrylate, 41.5 g of methyl methacrylate, 14.5 g of hydroxyethyl acrylate and 2.5 g of acrylic acid. The composition of the remainder of the initial reactor contents and the meterings were as in Example 2.

After cooling, a stable dispersion having a solids content of 60.9%, a K value of 115, and a viscosity of 9400 mPa.s (Brookfield rheometer, 20 rpm) was obtained.

COMPARATIVE EXAMPLE D

The procedure of Example 2 was repeated. However, 548 g of vinyl acetate, 168 g of vinyl laurate and 26.5 g of 2-ethylhexyl acrylate were emulsified into the reactor. Metering 1 was changed to 100 g of 2-ethylhexyl acrylate, 14.5 g of hydroxyethyl acrylate and 2.5 g of acrylic acid. The composition of the remainder of the initial reactor contents and the meterings were as in Example 2.

After cooling, a stable dispersion having a solids content of 60.9%, a K value of 115, and a viscosity of 1200 mPa.s (Brookfield rheometer, 20 rpm) was obtained.

APPLICATION TESTING

The following determination methods were used:

Peeling Resistance (at 23° C. and 50% Relative Humidity)

The aqueous contact adhesives from the examples and the dispersions from the comparative examples were applied wet in a coating thickness of 100 μm, corresponding to 75 g/m$^2$ dry, to beech bars measuring 20×2 cm$^2$ and were dried for 45 minutes under standard climatic conditions (23° C., 50% relative atmospheric humidity). A PVC strip having an area of 15.5×2 cm$^2$ was subsequently placed on the beech bar in such a way that the adhesive coatings came into contact with one another and were then pressed down by rolling a 3.5 kg steel roller back and forth five times.

The bonding was carried out in such a manner that the free end of the PVC strip projected over a lateral side of the beech bar. A 300 g weight was immediately attached to the free end of the PVC strip, and the beech bar was fixed to the PVC strip on the underside so that an angle of 90° was formed between the bonded and free ends of the PVC strip. The weight was attached in such a manner that the force acted uniformly over the entire width of the PVC strip. The time was measured in which the PVC strip peeled off over a distance of 10 cm under the constant load of 300 g. To this end, the peeled distance was measured after a test time of 1, 3 and 7 days, and the quotient of test time in minutes and peel distance in centimeters was calculated. Table 3 shows the measured values of the peeling resistances after 1, 3 and 7 days. The values indicated represent the mean of three individual measurements in each case.

Shear Resistance (at 23° C. and 50% Relative Humidity)

The aqueous contact adhesives from the examples and the dispersions from the comparative examples were applied wet in a coating thickness of 100 μm to beechwood test specimens measuring 7×2×0.5 cm and were dried for 20 minutes under standard climatic conditions. Two test specimens were subsequently placed together so that the adhesive coatings came into contact with one another and an overlapped adhesive area of 4 cm$^2$ was formed. The test specimens fixed in this way were pressed together for 10 seconds at a pressure of 0.2 N/mm$^2$. The adhesive bonds produced in this way were kept under standard climatic conditions for 24 hours. The test specimens were subsequently mounted vertically and loaded with a weight of 2 kg at an angle of 180°. The time which passed before the adhesive bonds broke was measured in minutes. Table 2 shows the measured values for the shear resistance. The values indicated represent the mean of three individual measurements in each case.

Thermal Shear Resistance (as a Function of Temperature f(T))

The aqueous contact adhesives from the examples and the dispersions from the comparative examples were applied in a coating thickness of 100 μm to beechwood test specimens measuring 7×2×0.5 cm and were dried for 20 minutes under standard climatic conditions. Two test specimens were subsequently placed together so that the adhesive coatings came into contact with one another and an overlapped adhesive area of 4 cm$^2$ was formed. The test specimens fixed in this way were pressed together for 10 seconds at a pressure of 0.2 N/mm$^2$. The adhesive bonds produced in this way were kept under standard climatic conditions for 24 hours.

The test specimens were subsequently mounted vertically, inverted in a drying cabinet prewarmed to 50° C. and loaded with a weight of 2 kg at an angle of 180°. The temperature of the drying cabinet was increased by 25° C. every 60 minutes. The temperature prevailing and the time which passed in minutes before the adhesive bonds broke was measured. Table 2 shows the measured values for the thermal shear resistance. The values represent the mean of three individual measurements.

Tensile Strength (at 23° C. and 50% Relative Humidity)

The aqueous contact adhesives from the examples and the dispersions from the comparative examples were applied wet in a coating thickness of 100 μm to beechwood test specimens measuring 12.3×3×0.3 cm and dried for 30 minutes under standard climatic conditions. Two test specimens were subsequently placed together so that the adhesive coatings came into contact with one another and an overlapped adhesive area of 9 cm$^2$ was formed. The test specimens fixed in this way were pressed together for 10 seconds at a pressure of 0.8 N/mm$^2$. The tensile strength in N/mm$^2$ of the test specimens produced in this way was determined immediately and after storage for three days under standard climatic conditions using a tensile tester (Zwick 1445 material testing machine) at a rate of 50 mm/min. Table 1 shows the measured values for the tensile strength after appropriate storage. The values represent the mean of six individual measurements in each case.

Peel Strength (at 23° C. and 50% Relative Humidity)

The aqueous contact adhesive from the examples and the dispersions from the comparative examples were applied wet in a coating thickness of 100 μm, corresponding to 75 g/m$^2$ dry, to PVC strips (DIN-PVC covering) measuring 20×2 cm$^2$ and to beech bars measuring 15.5×2 cm$^2$ and were dried for 45 minutes under standard climatic conditions (23° C., 50% relative atmospheric humidity). The PVC strip covering an area of 15.5×2 cm$^2$ was subsequently placed on the beech bar in such a manner that the adhesive coatings came into contact with one another, and were pressed down by rolling back and forth five times with a 3.5 kg steel roller. The test specimens produced in this way were, immediately or after storage for three days under standard climatic conditions, clamped in a tensile tester (Zwick 1445 material testing machine) and separated by peeling at an angle of 90° at a rate of 300 min/cm. The peel strength is the force in N/cm used to accomplish this. Table 1 shows the measured values for the peel strength after appropriate storage. The values represent the mean of three individual measurements.

Test Results

Analysis of the adhesives described in Examples 1 and 2 and in Comparative Examples A to D by means of the above-identified test methods (tensile strength, peel strength, shear resistance, peeling resistances and thermal shear resistance) gave the results shown in Tables 1 to 3.

Explanation of the Test Results

Example 1

Adhesive bonds based on this dispersion are shear resistant (Table 2) and have a peeling resistance of about 5300 min/cm. At elevated temperature, the bonds shear after 10 minutes at 75° C. Table 3 shows that the bonds are peel resistant after 3 days (no further change in a peeled distance if remeasured after 7 days). The glass transition temperature of the resin is about −5° C.

Example 2

Adhesive bonds based on this dispersion are shear resistant and have a peeling resistance of about 1100 min/cm. At elevated temperature, the bond shears after 48 minutes at 50° C. Table 3 shows that the peel rate of the bonds slows over a period of 7 days. The glass transition temperature is about +5° C.

Example 3

In this example, the vinyl laurate is replaced by VeoVa-9. The adhesive bonds are shear resistant and have a peeling resistance of about 1700 min/cm.

Comparative Example A

In this experiment, the percentage of methyl methacrylate was reduced to half compared with Example 1. The composition of the other monomers was selected so that the glass transition temperature range remained the same. Adhesive bonds produced using this dispersion are no longer shear resistant and have a significantly lower peeling resistance than Example 1. Nor are adhesive bonds produced using this dispersion resistant to peeling after a few days.

Comparative Example 3

In this experiment no methyl methacrylate was employed. The composition of the other monomers was selected so that the glass transition temperature range was as in Example A. Adhesive bonds produced using this dispersion no longer have high shear resistance and have only very low peeling resistance.

Comparative Example C

In this experiment, the percentage of methyl methacrylate was reduced to half compared with Example 2. The composition of the monomers was selected so that the glass transition temperature range was as in Example 2. Adhesive bonds produced using this dispersion are not shear resistant and have no peeling resistance.

Comparative Example D

In this experiment, no methyl methacrylate was employed. The composition of the other monomers was selected so that the glass transition temperature range was as in Example 2. Adhesive bonds using this dispersion have no shear resistance or peeling resistance.

TABLE 1

| | Tensile strength and peel strength tests | | | |
|---|---|---|---|---|
| | Tensile strength wood/wood [N/mm$^2$] | | Peel strength PVC/wood [N/cm] | |
| Example | room temp. (initial) | room temp. (3 days) | room temp. (initial) | room temp. (3 days) |
| 1 | 1.00 | 2.80 | 7.40 | 20.30 |
| 2 | 0.90 | 2.20 | 6.00 | 13.10 |
| 3 | 0.76 | 2.37 | 10.50 | 11.10 |
| 4 | 1.00 | 2.70 | 8.60 | 21.40 |
| 5 | 1.00 | 2.20 | 10.40 | 21.50 |
| A | 1.00 | 1.90 | 14.60 | 21.10 |
| B | 0.90 | 1.70 | 9.20 | 20.10 |
| C | 0.70 | 1.30 | 10.20 | 12.70 |
| D | 0.50 | 0.80 | 5.70 | 8.00 |

TABLE 2

Shear resistance and peeling resistance tests

| Example | Shear resistance wood/wood | | Peeling resistance PVC/wood [min/cm] room temperature |
|---|---|---|---|
| | standard climatic conditions [min] | f(T) [T/min] | |
| 1 | >8000 | 75/10 | 5305 |
| 2 | >8000 | 50/48 | 1133 |
| 3 | >8000 | 75/6 | 1708 |
| 4 | >8000 | 75/30 | 10610 |
| 5 | >8000 | 75/40 | 3600 |
| A | 1500 | 50/30 | 2520 |
| B | 248 | 50/5 | 631 |
| C | 15 | 50/2 | 3 |
| D | 2 | 50/0 | 0 |

TABLE 3

Change in peeling resistance with time

| Ex-ample | Peeling resistance | | | | | |
|---|---|---|---|---|---|---|
| | 1 day | | 3 days | | 7 days | |
| | cm | min/cm | cm | min/cm | cm | min/cm |
| 1 | 1.1 | 1309 | 1.9 | 2274 | 1.9 | 5305 |
| 2 | 5.2 | 277 | 6.5 | 665 | 8.9 | 1133 |
| 3 | 3.0 | 480 | 5.2 | 831 | 5.9 | 1708 |
| 4 | 0.85 | 1694 | 0.9 | 4800 | 0.95 | 10610 |
| 5 | 1.25 | 1152 | 1.8 | 2400 | 2.8 | 3600 |
| A | 1.0 | 1440 | 2.0 | 2160 | 4.0 | 2520 |
| B | 3.25 | 443 | 4.8 | 600 | 6.85 | 631 |
| C | 10.0 | 3 | — | — | — | — |
| D | peels immediately | — | — | — | — | — |

We claim:

1. An aqueous contact adhesive dispersion which contains, based on the total weight of the dispersion, from 40 to 70% by weight of a copolymer which has been prepared by emulsion polymerization, whose glass transition temperature is in the range from −20 to +20° C. and whose Fikentscher K value is between 50 and 180, wherein the copolymer comprises the following components;
   a) from 40 to 70% by weight of vinyl esters of aliphatic carboxylic acids having 2 to 12 carbon atoms,
   b) from 10 to 40% by weight of acrylic acid esters of aliphatic alcohols having 4 to 12 carbon atoms,
   c) from 8 to 15% by weight of methacrylic acid esters of aliphatic alcohols having 4 to 12 carbon atoms,
   d) from 0.1 to 3% by weight of ethylenically unsaturated compounds which cause cross-linking,
   e) from 0.1 to 5% by weight of ethylenically unsaturated carboxylic acids,
   f) from 0.1 to 2% by weight of substituted or unsubstituted (meth)acrylamides,
   g) from 0.5 to 3% by weight of ethylenically unsaturated hydroxyalkyl-functional compounds, and
   h) from 0.5 to 3% by weight of ethylenically unsaturated sulfates and/or sulfonates, where the amount for each component is based on the total weight of the copolymer, and the total amount of the components is 100% by weight.

2. An aqueous contact adhesive dispersion as claimed in claim 1, wherein the vinyl esters (a) are selected from the group consisting of vinyl acetate, vinyl propionate, vinyl laurate, vinyl esters of the saturated α-branched monocarboxylic acids having 9 carbon atoms, and mixtures of said monomers.

3. An aqueous contact adhesive dispersion as claimed in claim 1 wherein the acrylic acid esters (b) are selected from the group consisting of n-butyl acrylate, 2-ethylhexyl acrylate, and mixtures thereof.

4. An aqueous contact adhesive dispersion as claimed in claim 1, wherein the methacrylic acid esters (c) are selected from the group consisting of methyl methacrylate, tert-butyl methacrylate, ethyl methacrylate, n-propyl methacrylate, i-propyl methacrylate, and mixtures of said monomers.

5. An aqueous contact adhesive dispersion as claimed in claim 1, wherein the ethylenically unsaturated compounds (d) which cause crosslinking are selected from the group consisting of acrylamidoglycolic acid (AGA), methylacrylamidoglycolic acid methyl ester (MAGME), 2-acrylamido-2-methylpropanesulfonic acid (AMPSA), N-methylolacrylamide, N-methylolmethacrylamide, N-methylolallyl carbamate, alkyl ethers of N-methylolacrylamide, alkyl esters of N-methylolocrylamide, alkyl ethers of N-methylolmethacrylamide, alkyl esters of N-methylolmethacrylamide, alkyl ethers of N-methylolallyl carbamate and alkyl esters of N-methylolallyl carbamate.

6. An aqueous contact adhesive dispersion as claimed in claim 1, wherein the comonomer (e) is acrylic acid or methacrylic acid.

7. An aqueous contact adhesive dispersion as claimed in claim 1, wherein the comonomer (f) is acrylamide.

8. An aqueous contact adhesive dispersion as claimed in claim 1, wherein the comonomer (g) is selected from the group consisting of 2-hydroxyethyl acrylate and 2-hydroxypropyl acrylate.

9. An aqueous contact adhesive dispersion as claimed in claim 1, wherein the comonomers (h) are alkali metal salts of vinylsulfonic acid.

* * * * *